United States Patent [19]

Golder

[11] 3,853,806

[45] Dec. 10, 1974

[54] HETEROGENEOUS MELT HYDROLYSIS OF OXYMETHYLENE COPOLYMERS

[76] Inventor: Michael D. Golder, 2441 Webb Ave., Bronx, N.Y. 10468

[22] Filed: Apr. 12, 1973

[21] Appl. No.: 350,427

Related U.S. Application Data

[63] Continuation-in-part of Ser. No. 247,625, April 26, 1972.

[52] U.S. Cl.......... 260/37 AL, 260/30.2, 260/67 FP
[51] Int. Cl............................................. C08g 51/04
[58] Field of Search............ 260/37 AL, 30.2, 67 FP

[56] References Cited
UNITED STATES PATENTS

| | | | |
|---|---|---|---|
| 3,169,938 | 2/1965 | Evers et al...................... | 260/37 AL |
| 3,189,615 | 6/1965 | Heller................................ | 260/30.2 |
| 3,219,623 | 11/1965 | Berardinelli.................... | 260/37 AL |
| 3,318,848 | 5/1967 | Clark................................. | 260/67 FP |
| 3,418,280 | 12/1968 | Orgen.............................. | 260/67 FP |
| 3,450,665 | 6/1969 | Wagner et al.................. | 260/37 AL |

OTHER PUBLICATIONS

Encyclopedia of Polymer Science & Technology, Volume 6, 1967, pp. 740–45.

Primary Examiner—Morris Liebman
Assistant Examiner—E. Suzanne Parr
Attorney, Agent, or Firm—Thomas J. Morgan; Linn I. Grim; John A. Shedden

[57] ABSTRACT

A process for the stabilization of a normally solid oxymethylene copolymer whose molecules contain a majority of relatively unstable monomeric oxymethylene units interspersed with comparatively stable, monomeric higher oxyalkylene units, e.g., $-O-CH_2-CH_2-$ units, at least part of the terminal portions of said molecules comprising said unstable monomeric units, which involves hydrolyzing said copolymer in the presence of water, alcohol, trioxane or mixtures thereof at elevated temperatures and pressures such that the copolymer is in a molten state and the water, alcohol, trioxane or mixtures thereof is present as a vapor.

13 Claims, No Drawings

HETEROGENEOUS MELT HYDROLYSIS OF OXYMETHYLENE COPOLYMERS

The invention relates to stabilized polymers and, more particularly, to polymers which are comparatively stable against degradation but which are derived from polymers which have a higher susceptibility to such degradation. The invention also relates to a method of stabilizing such polymers.

Certain polymers are comprised of comparatively stable and comparatively unstable monomeric units and many times the resistance of such polymers to degradation depends upon the relative location of the aforementioned stable and unstable monomeric units. For example, if a polymer is susceptible to degradation by a mechanism which attacks the ends of the polymer molecules it can be seen that if the ends of the molecules are susceptible to degradation, the polymer will have less stability than if the molecule ends are relatively stable to degradation.

While the subject invention will be described with reference to thermally stabilized oxymethylene polymers it should not be limited thereto as the principles of the invention are applicable to other polymers having appropriate stable and unstable units.

In general, the invention involves the stabilization of a polymer having stable and unstable units in its molecules by treating the polymer in such a way as to selectively degrade the polymer and remove unstable terminal units from its molecules.

In a preferred embodiment of this invention there is provided a method of stabilizing a heterogeneous polymer against thermal degradation wherein the unstabilized polymer is susceptible to such degradation inasmuch as it contains monomeric units of comparatively high susceptibility of thermal degradation which are interspersed with other monomeric units which are comparatively stable to thermal degradation. The invention comprises subjecting the polymer to a treatment to degrade the end portions of the molecules of the polymer which are made up of the comparatively susceptible monomeric units thereby leaving a residual polymer having the comparatively stable monomeric units in terminal portions of its molecules. In one embodiment of this invention at least 90 percent of the polymeric chains of the molecules of the treated polymer have comparatively stable or comparatively thermal-resistant units in terminal positions.

Oxymethylene polymers, having recurring —OCH$_2$— units directly attached to each other, have been known for many years. They may be prepared by the polymerization of anhydrous formaldehyde or by the polymerization of trioxane, which is a cyclic trimer of formaldehyde. High molecular weight oxymethylene polymers vary in thermal stability and, in accordance with a preferred embodiment of this invention, the polymer which is stabilized is an oxymethylene polymer containing carbon-to-carbon single bonds in the main polymer chain.

In a particularly preferred embodiment of the invention the polymeric compounds to be treated are oxymethylene copolymers having at least one chain containing recurring oxymethylene units interspersed with —OR— groups in the main polymer chain, where R is a divalent radical containing at least two carbon atoms directly linked to each other and positioned in the polymer chain between the two valences, with any substituents on said R radical being inert, that is those which are free of interfering functional groups and will not induce undesirable reactions. Particularly preferred are copolymers which contain from 60 to 99.6 mol percent of recurring oxymethylene groups. In a preferred embodiment R may be, for example, an alkylene or substituted alkylene group containing at least two carbon atoms.

Among the copolymers which may be utilized in accordance with this aspect of the invention are those having a structure comprising recurring units having the formula

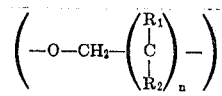

wherein $n$ is an integer from zero to 5 and wherein n is zero in from 60 to 99.6 percent of the recurring units. $R_1$ and $R_2$ are inert substituents, that is, substituents which are free of interfering functional groups and will not induce undesirable reactions.

A preferred class of copolymers are those having a structure comprising oxymethylene and oxymethylene recurring units wherein from 60 to 99.6 percent of the recurring units are oxymethylene units.

Particularly preferred oxymethylene polymers are those having incorporated oxyalkylene units having adjacent carbon atoms which are derived from cyclic ethers having adjacent carbon atoms. These copolymers may be prepared by copolymerizing trioxane with a cyclic ether having the structure

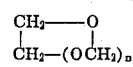

wherein $n$ is an integer from zero to 2.

Examples of preferred polymers include copolymers of trioxane and cyclic ethers containing at least two adjacent carbon atoms such as the copolymers disclosed in U.S. Pat. No. 3,027,352 by Cheves T. Walling, Frank Brown and Kenneth W. Bartz, which patent is assigned to the same assignee as the subject application.

Among the specific cyclic ethers which may be used are ethylene oxide; 1,3-dioxolane; 1,3,5-trioxepane; 1,3-dioxane; trimethylene oxide; pentamethylene oxide; 1,2-propylene oxide; 1,2-butylene oxide; neopentyl glycol formal; pentaerythritol diformal; paraldehyde; tetrahydrofuran and butadiene monoxide.

As used in the specification and claims of this application, the term "copolymer" means polymers having two or more monomeric groups, including terpolymers and higher polymers. Suitable terpolymers include those disclosed in U.S. patent application Ser. No. 229,715, filed Oct. 10, 1962, by W. E. Heinz and F. B. McAndrew, which is assigned to the same assignee as the subject application.

In particular, the subject invention relates to a process for the stabilization of a normally solid oxymethylene copolymer having a melting point above 150°C, the molecules of said copolymer containing from 60 to 99.6 mol percent of comparatively unstable monomeric oxymethylene units interspersed with comparatively stable monomeric —O—R— units wherein R is a divalent radical containing at least two carbon atoms directly linked to each other and positioned in the polymer chain between the two valences, with any substituents on said R radical being inert, at least part of the terminal portions of said molecules comprising said unstable monomeric units, said process comprising placing said polymer and between about 2 to about 25 weight percent of said polymer of a reactant selected from the groups consisting of water, alcohol, trioxane and mixtures thereof in a reactor, reacting said polymer with said reactant by exposing said polymer and said reactant to a temperature above the melting point of said copolymer, preferably between about 160°C and about 240°C and a pressure sufficient to maintain said polymer in a liquid state and said reactant in a vaporous state preferably less than about 150 psia., for between about 0.01 and about 15 minutes, said temperature and time being sufficient to remove said stable monomeric units from the terminal portions of said molecules so that said molecules are terminated by said stable monomeric units and removing the unreacted reactant and other volatilizable material by reducing the pressure to a pressure between about 0.1 psia and about 50 psia so that said materials are volatized.

The preferred polymers which are treated in this invention are thermoplastic materials having a melting point of at least 150°C. and are normally millable at a temperature of 200°C. These polymers have a high thermal stability before treatment in accordance with this invention but this stability is markedly improved by such treatment. For example, if a sample of the polymer which has been treated in accordance with this invention, and which has also been chemically stabilized as described below, is placed in an open vessel in a circulating air oven at a temperature of 230°C. and its weight loss is measured without removal of the sample from the oven, it will have a thermal degradation rate of less than 1.0 wt. percent per min. for the first 45 minutes and, in preferred instances, less than 0.1 wt. percent/min. for the same period of time.

The preferred polymers which are treated in this invention have a melt index (M.I.) of less than 50, preferably less than 30 via ASTM D 1238-62T. After treatment the preferred copolymers exhibit remarkable alkaline stability. For example if the treated copolymers are refluxed at a temperature of about 142°C. 145°C. in a 50 percent solution of sodium hydroxide in water for a period of 45 minutes, the weight of the copolymer will be reduced by less than 1 percent.

The preferred catalysts used in the preparation of the desired copolymers are boron fluoride and boron fluoride coordinate complexes with organic compounds, particularly those in which oxygen or sulfur is the donor atom.

The coordinate complex of boron fluoride may, for example, be a complex with a phenol, an ether, an ester, or a dialkyl sulfide. Boron fluoride dibutyl etherate, the coordinate complex of boron fluoride with dibutyl ether, is a preferred coordinate complex. The boron fluoride complex with diethyl ether is also very effective. Other boron fluoride complexes which may be used are complexes with methyl acetate, with ethyl acetate, with phenyl acetate, with dimethyl ether, with methyl phenyl ether and with dimethyl sulfide. Suitable catalysts are disclosed in U.S. Pat. Nos. 2,989,505, 2,989,506, 2,989,507, 2,989,509, all of which are by Donald E. Hudgin and Frank M. Berardinelli; U.S. Pat. No. 2,989,510, by George J. Bruni; and U.S. Pat. No. 2,989,511 by Arthur W. Schnizer. All the above patents are assigned to the same assignee as the subject application.

The coordinate complex of boron fluoride should be present in the polymerization zone in amounts such that boron fluoride content is between about 0.001 and about 1.0 weight percent based on the weight of the monomers in the polymerization zone. Preferably, amounts between about 0.003 and about 0.1 weight percent should be used.

The monomers in the reaction zone are preferably anhydrous or substantially anhydrous. Small amounts of moisture, such as may be present in commerical grade reactants or may be introduced by contact with atmospheric air, will not prevent polymerization, but should be removed for best yields.

In preparing the preferred copolymers, the trioxane, cyclic ether and catalyst are disolved in a common anhydrous solvent such as cyclohexane, and permitted to react in a sealed reaction zone. The temperature in the reaction zone may vary from about 0° C. to about 120°C. The period of reaction may vary from about 5 minutes to about 72 hours. Pressures from subatmospheric to about 100 atmospheres, or more, may be used, although atmospheric pressure is preferred.

The chemical constitution of the cyclic ether must be considered. Thus, 1,3-dioxolane contains both an oxymethylene group and an oxyethylene group. Its incorporation into the copolymer molecule increases both the oxymethylene and the oxyethylene content of the polymeric molecule.

In general, the cyclic ether is present in the reaction mixture in amounts between about 0.2 and about 30 mol percent, based on the total mols of monomer. The optimum proportion will depend on the particular copolymer desired, the expected degree of conversion and the chemical constitution of the cyclic ether used.

The copolymers produced from the preferred cyclic ethers have a structure substantially composed of oxymethylene and oxyethylene groups in a ratio from about 250:1 to about 1.5:1.

Upon completion of the polymerization reaction it is desirable to neutralize the activity of the polymeriztion catalyst since prolonged contact with the catalyst degrades the polymer. The polymerization product may be treated with an aliphatic amine such as tri-n-butylamine or triethylamine, in stoichiometric excess over the amount of free catalyst in the reaction product, and preferably in an organic wash liquid which is a solvent for unreacted trioxane. Or, if desired, the reaction product may be washed with water which neutralizes catalyst activity. A detailed description of suitable methods of neutralizing catalyst activity may be found in U.S. Pat. No. 2,989,509 by Donald E. Hudgin and Frank M. Berardinelli, assigned to the same assignee as the subject application.

In accordance with the subject invention, the comparatively stable monomeric portions or units of the polymer may be removed by a process which comprises treating the polymer with a reactant under conditions at elevated temperature and pressure such that the polymer-reactant system is a heterogeneous one, i.e. a two phase system; the polymer being in a molten state and the reactant being in a vaporous state; and continuing reaction for a period of time sufficient to remove comparatively unstable portions or units from the ends of the polymer molecules so that the molecules are terminated by comparatively stable units.

The polymer-reactant system may achieve this two phase form by a number of methods, such as (1) melting the polymer and adding the reactant thereto under such conditions that the reactant remains in a vapor state, or (2) mixing the polymer and the reactant and then heating under pressure until the polymer-reactant system is in the molten liquid-vaporous state.

Where the copolymer is one with the comparatively unstable units being oxymethylene units, the preferred treatment is a "hydrolysis" treatment under alkaline conditions. In a preferred embodiment the polymer is reacted with from about 2 weight percent to about 25 weight percent of the preferred hydrolysis reactant. The reaction must take place at an elevated temperature and pressure such that the polymer will be in a molten liquid condition and the reactant will be in a vaporous i.e., gaseous state. Thus the treatment may be referred to as a "heterogeneous melt hydrolysis" as opposed to the homogeneous molten hydrolyses which are disclosed in U.S. Pat. No. 3,318,848 by Charles M. Clarke issued May 9, 1967 and U.S. Pat. No. 3,418,280 by Donald E. Orgen issued Dec. 24, 1968 both of which are assigned to the same assignee as the subject invention.

The hydrolytic reactant may be water or a primary, secondary or tertiary aliphatic or aromatic alcohol or trioxane. Of primary consideration in the selection of said alcohol is that its thermodynamic properties are such that under the processing criteria of the instant invention, the alcohol and/or said alcohol-water and/or alcohol-water-trioxane mixtures are in the vaporous state. Suitable alcohols include aliphatic alcohols and preferably those methyl alcohol, ethyl alcohol, n-propyl alcohol isopropyl alcohol, etc.

As used herein the term "hydrolysis" includes the reaction of the polymer with water or the aforementioned hydroxy-containing materials or trioxane or mixtures thereof.

The terminal units of the oxymethylene polymer are often hydroxy-substituted oxymethylene

$$(-O-CH_2-OH)$$

units and detachment of an oxymethylene group from the polymer molecule by the hydrolysis reaction has the effect of shifting the hydrogen atoms of the hydroxyl group to the oxygen atoms of the next adjacent oxymethylene group.

When oxyethylene units, for example, are incorporated in the polymer chain by copolymerization as described above, the successive detachment of oxymethylene units takes place until an oxyethylene unit becomes the terminal unit of the chain. The oxyethylene units, having carbon-to-carbon bonds therein, are comparatively resistant to such detachment, and remain attached to the polymeric chain in the terminal position and protect the internal oxymethylene units from further hydrolytic removal. Since oxyethylene units are also resistant to detachment by heat, the degraded molecule has a better initial thermal stability than the orginal copolymer from which it was derived.

It has been found that the products of the selective treatment of this invention, after substantially constant weight is achieved, are also extremely stable against attack by the reaction conditions. Therefore, in a preferred embodiment, the polymer is subjected to the reaction conditions until it achieves substantially constant weight. Thus, an oxymethylene copolymer having had the hydrolytic treatment, is not only thermally stable but is also extremely stable against such further hydrolytic treatment even at conditions more severe than those of the treatment despite the fact that the polymer still has a substantial content of internal oxymethylene units which are normally subject to degradation by alkaline hydrolysis unless protected by suitable end groups which are resistant to degradation under such conditions.

Preferably, the hydrolysis reaction takes place under alkaline vapor conditions such that the pH of the hydrolysis reactant, when added to the polymer, is above 9.0. To obtain such a pH, alkaline material must be present. The alkaline material is preferably water soluble, or soluble in the hydroxy-containing material, and may be a strongly basic hydroxide such as the hydroxide of an alkali metal or alkaline earth metal, or it may be the salt of a strong base and a weak acid, or it may be ammonia or an organic base such as amine or an amidine.

Among the specific alkaline materials which may be used are sodium hydroxide, potassium hydroxide, sodium carbonate, sodium acetate, ammonium hydroxide, triethylene amine tripropyl amine, tetramethyl guanidine, trimethylamine, triethylamine, tributylamine, melamine, calcium hydroxide etc. The amount of alkaline material present in the chemical reaction is from 0.001 weight percent of about 10.0 weight percent, preferably between about 0.001 weight percent and about 1.0 weight percent.

One advantage of the alkaline hydrolysis over neutral hydrolysis is that the alkaline hydrolysis is faster and the alkaline material will neutralize any excess polymerization catalyst present or any acidic material formed during the reaction which might otherwise tend to degrade the polymer during the hydrolysis step.

In certain instances it is desirable to obtain the desired pH by adding an alkaline material, such as triethylamine, in an amount sufficient that triethylamine will maintain basic conditions throughout the course of the hydrolysis reaction and will react with any acidic materials formed.

In suitable embodiments an amount of 0.25 weight percent triethylamine, based on the weight of polymer, would be sufficient. Therefore, if 5 percent hydrolysis reactant was added to the polymer the hydrolyzed solution could contain 5.0 weight percent triethylamine and the pH of the hydrolysis solution would be adjusted before addition to the polymer. In some instances it may be that some water is contained in the polymer in addition to that added in the hydrolysis solution.

After the polymerization reaction it may be desirable to subject the polymer to washing and drying in order to neutralize the active catalyst and remove unreacted monomers, solvent and catalyst residues. Specifically, water or a mixture of an alcohol, such as methanol and water, may be used in which small amounts of ammonia or an amine such as triethylamine may be present.

On some occasions it may be desirable to mix the polymer with a larger amount of reactant and after the catalyst has been neutralized remove a portion of the reactant by filtering, vaporization, etc. in order to retain only between 2 and 25 weight percent of reactant present with the polymer during the hydrolysis reaction.

In another embodiment it may be desirable to neutralize the catalyst and then filter, wash and dry the polymer. The polymer may then be conveniently kept until it is subjected to the hydrolysis treatment at a later time.

In a preferred embodiment of the invention it is also desirable to incorporate one or more chemical stabilizers into the copolymer in order to bring its thermal degradation rate even lower. The proportion of stabilizer incorporated depends upon the specific stabilizer used. A proportion between about 0.05 and 10 weight percent (based on the weight of polymer) has been found to be suitable for most stabilizers.

One suitable stabilizer system is a combination of (1) an anti-oxidant ingredient, such as phenolic anti-oxidant, and most suitably a substituted bisphenol, and (2) an ingredient to inhibit chain scission, generally a compound of a polymer containing trivalent nitrogen atoms.

A suitable class of substituted bisphenols are the alkylene bisphenols including compounds having from 1 to 4 carbon atoms in the alkylene group and having from zero to 2 alkyl substituents on each benzene ring, each alkyl substituent having from 1 to 4 carbon atoms. The preferred alkylene bisphenols are 2,2'-methylene bis(4-methyl-6-tertiary butyl phenol) and 4,4'-butylidene bis(6-tertiary butyl-3-methyl phenol). Suitable phenolic stabilizers other than alkylene bisphenols include 2,6-ditertiary butyl-4-methyl phenol, octyl phenol and p-phenyl phenol.

Suitable scission inhibitors include carboxylic polyamides, polyurethanes, substituted polyacrylamides, polyvinyl pyrrolidone, hydrazides, compounds having 1 to 6 amide groups, proteins, compounds having tertiary amine and terminal amide groups, compounds having amidine groups, cycloaliphatic amine compounds and aliphatic acylureas. The stabilizers may be present in the heterogeneous melt hydrolysis step or they may be added to the hydrolyzed polymer after said step.

After the heterogeneous melt hydrolysis reaction has been completed and a satisfactory amount of unstable monomeric units have been removed from the polymer molecules, the remaining chemical reactant is removed from the treated polymer. Also the degradation or reaction products and, on occasion, unreacted materials, such as trioxane, should also be removed. Formaldehyde is the principal hydrolysis degradation product of oxymethylene polymers and it is believed to be formed by the successive detachment of the terminal oxymethylene units from the end of the polymer chain. In some instances, particularly when the polymerization reaction product is promptly hydrolyzed, the hydrolyzed material may include some unreacted trioxane. In accordance with a preferred embodiment of this invention the chemical reactant, the formaldehyde, the trioxane and other volatizable materials may be removed by suddenly reducing the pressure under which the materials have been maintained, which in view of the temperature, results in the volatilization of the volatile materials. The lower pressure should be between about 0.1 p.s.i.a. and 50 p.s.i.a. and is preferably accomplished by exposing the materials to atmospheric pressure or a slight vacuum (about 0.5 p.s.i.a.). Then, if desired the stabilized polymer may be extruded and treated further. In certain instances after extrusion the extruded strands are pelletized and stored until the polymer is ready for use.

In a preferred embodiment of this invention the time during which the molten polymer is subjected to elevated temperatures and pressures in the presence of the vaporous reactant (this time is known as residence time) falls between about 0.1 and about 15 minutes. The temperature range is preferably between about 160°C. and about 240°C.

The pressure range is that necessary to maintain the two phase reaction i.e., the polymer in a molten state and the reactants in a vaporous condition; preferably below about 150 p.s.i.a.

The residence time, temperature and pressure are interrelated and are preferably maintained so that the polymer-reactant system remains in the aforedescribed state and the reaction proceeds sufficiently so that the desired amount of unstable units are removed from the ends of the polymer molecules so that they are terminated by comparatively stable units.

The following examples used a trioxane-ethylene oxide copolymer containing about 2 weight percent of oxyethylene groups distributed in the oxymethylene chains. Also, the reaction product from the polymerization reactor was washed with water and dried to neutralize and remove the catalyst and to remove unreacted trioxane.

In Examples 1 to 14, a two stage extrusion is utilized to illustrate the product $K_d$ values currently realizable via the prior art-taught high-pressure homogeneous molten hydrolysis process i.e., an all-liquid process. ($K_d$ refers to the percent polymer weight loss per minute determined by heating the polymer which has been stabilized with an antioxidant and a formaldehyde scavenger in an open vessel in a circulating air oven at a temperature of 230°C).

EXAMPLES 1–14

The polymer is force fed to a one inch single screw extruder having a length to diameter ratio of 20/1. The feed section of the extruder had five turns and a channel depth of 185 mils. Thus the polymer is fed under pressure to the metering of melt hydrolysis section which has 6 turns with a channel depth of 60 mils. The reactant is pumped into the extruder at the beginning of the melt hydrolysis section. Next there is a restricted section of one and one-half turns with a channel depth of 22 mils. This restricted section maintains pressures in the melt hydrolysis section. The polymer-reactant system then passes to a vented section (which may be referred to as a low pressure section) having four turns with a channel depth of 220 mils. When the heated, pressurized polymer-reactant system passes to the vented section the pressure is suddenly reduced and the formaldehyde, reactant, and other vaporizable components are removed through the vent. The treated polymer then passes through a pumping (or pre-extrusion) section having 3 ½ turns with a channel depth of 60 mils, where the polymer is densified. The polymer is subsequently extruded through a die. The chemical stabilizers are then blended with the polymer and re-extruded.

The operating parameters and resulting $K_{D230}$'s are tabulated in Table I.

TABLE I

| Example | % Solvent | % TEA | Hydrolysis Temp. (°F) | Pressure of Hydrolysis psi | Product $K_{d230}$°C |
|---|---|---|---|---|---|
| 1 | 5.3 | 4 | 350 | Above 750 | .029 |
| 2 | 5.3 | 4 | 401 | do. 750 | .047 |
| 3 | 5.0 | 4 | 400 | do. 750 | .023 |
| 4 | 8.6 | 4 | 395 | do. 750 | .025 |
| 5 | 10.0 | 4 | 353 | do. 750 | .024 |
| 6 | 10.0 | 4 | 353 | do. 750 | .024 |
| 7 | 9.7 | 4 | 400 | do. 750 | .027 |
| 8 | 10.0 | 4 | 353 | do. 750 | .020 |
| 9 | 10.0 | 4 | 351 | do. 750 | .018 |
| 10 | 10.0 | 4 | 400 | do. 750 | .031 |
| 11 | 7.6 | 2.5 | 388 | do. 750 | .024 |
| 12 | 7.6 | 2.5 | 377 | do. 750 | .027 |
| 13 | 7.5 | 2.5 | 374 | do. 750 | .022 |
| 14 | 7.8 | 2.5 | 375 | do. 750 | .023 |

*Triethyl amine (TEA) and water

The following Examples 15-29, illustrating the unexpectedly low $K_{d230}$ values obtainable when the process criteria as taught by the instant invention are adhered to, are realized through the use of a co-rotating intermeshed twin-screw extruder. The machine has a total L/D ratio of 43 and is composed of feeding and melting sections with an L/D of 12.5; a hydrolysis section and solvent injection port with an L/D of 20.5 and devolatization and die pumping sections with an L/D of 10. A melt seal is formed at the beginning and end of the liquid polymer-vaporous reactant, hydrolysis zone by use of left handed screw bushings. Otherwise, the entire screw consists of right handed screw bushings; i.e., no kneading blocks are utilized. As in Examples 1-14, chemical stabilizers are then blended with the hydrolyzed polymer and the blend re-extruded. The operating parameters and the resulting $K_{d230}$'s an tabulated in Table II.

TABLE II

| Example | % Solvent | % TEA | Hydrolysis Temp.(°F) | Pressure of Hydrolysis (psi) | Product $K_{d230}$°C |
|---|---|---|---|---|---|
| 15 | 5.0 | 4.5 | 405 | 100 | .015 |
| 16 | 5.0 | 4.5 | 380 | 100 | .016 |
| 17 | 5.0 | 4.5 | 410 | 100 | .016 |
| 18 | 5.0 | 4.5 | 380 | 100 | .014 |
| 19 | 8.1 | 4.0 | 385 | 100 | .015 |
| 20 | 9.4 | 4.0 | 465 | 100 | .013 |
| 21 | 9.4 | 4.0 | 465 | 100 | .015 |
| 23 | 10.0 | 4.5 | 395 | 100 | .017 |
| 24 | 10.0 | 4.5 | 395 | 100 | .015 |
| 25 | 13.0 | 4.5 | 380 | 100 | .014 |
| 26 | 13.0 | 4.5 | 410 | 100 | .013 |
| 27 | 15.0 | 4.5 | 380 | 100 | .014 |
| 28 | 15.0 | 4.5 | 410 | 100 | .014 |
| 29 | 12.0 | 4.0 | 395 | 100 | .012 |

* Triethylamine (TEA) and water

To eliminate the possibility that the unexpectedly low $K_d$ values are attributable to the high shear rates in the twin screw extruder a series of runs were performed as in Examples 15-29 wherein the screw RPM was more than doubled. The negative results as reported in Examples 30-39, Table III, support the conclusion that the significantly improved $K_d$ values are a result of the two phase ie molten polymer-vaporous reactant hydrolysis.

TABLE III

| Example | TEA Level | Screw Speed(RPM) | $K_{d230}$ |
|---|---|---|---|
| 30 | Excess | 70 | 0.013 |
| 31 | do. | 90 | 0.013 |
| 32 | do. | 110 | 0.014 |
| 33 | do. | 130 | 0.015 |
| 34 | do. | 150 | 0.017 |
| 35 | Stoichiometric | 70 | 0.015 |
| 36 | do. | 90 | 0.013 |
| 37 | do. | 110 | 0.015 |
| 38 | do. | 130 | 0.013 |
| 39 | do. | 150 | 0.012 |

In all of the above examples, the following stabilizers were compounded into the polymer prior to $K_d$ analysis (weights based on the weight of the polymer): 0.03 weight percent melamine; 0.1 weight percent cyanoguanidine; and 0.5 weight percent 2,2' methylene bis-(4-methyl-6-tertiary butyl phenol).

Included within the scope of this invention is the addition before; within; and after the hydrolysis zone various additives well known to those skilled in the art. These additives include but are not limited to pigments; fillers and reinforcing agents such as glass fiber; calcium silicate; asbestos; etc.; flow modifiers and lubricants such as ethylene bis stearamide; U.V. stabilizers such as the substituted benzotriazoles as taught in U.S. Pat. Nos. 3,004,896 and 3,189,615, etc.

The copolymers of this invention are useful for convention to films, fibers, molded articles, and the like by melt extrusion, compression molding, injection molding and other fabrication methods known in the art.

It is to be understood that the foregoing detailed description is given merely by way of illustrating and that many variations may be made therein without departing from the spirit of my invention.

The embodiments of the invention in which an exclusive property or privilege is claimed are defined as follows.

What I claim is:

1. In an extruder process for the stabilization of a normally solid oxymethylene copolymer having a melting point above about 150°C., the molecules of said copolymer containing from 60 to 99.6 mol percent of comparatively unstable monomeric oxymethylene units interspersed with comparatively stable monomeric —OR— units wherein R is a divalent radical containing at least two carbon atoms directly linked to each other and positioned in the polymer chain between the two valences, with any substituents on said R radical being inert, at least part of the terminal portions of said molecules comprising said unstable monomeric units, whereby said copolymer is introduced into a reaction zone with from about 2 to about 25 weight percent, based on the copolymer, of a reactant selected from the class consisting of water, alcohols, and mixtures thereof, the improvement which comprises:

a. forming a system comprising molten copolymer and vaporous reactant in said zone by maintaining the reaction zone at a temperature above melting point of the copolymer and at a pressure sufficient to maintain the copolymer in a molten state and the reactant in a vaporous state, and b. reacting the molten copolymer with the reactant under the above conditions of temperature and pressure for a period of time in the range of from about 0.1 to about 15 minutes to remove unstable monomeric oxymethylene units from the terminal portion of the copolymer molecules so that at least 90 percent of the resulting polymeric chains of the molecules are terminated by the stable monomeric units.

2. The process of claim 1 wherein the temperature is in the range of from about 160° to 240°C.

3. The process of claim 1 wherein the pressure is below about 150 p.s.i.a.

4. The process of claim 1 wherein said stable units are oxymethylene units.

5. The process of claim 1 wherein any unreacted reactant is removed from the resulting stabilized copolymer by reducing the pressure in said reaction zone to a pressure in the range of from about 0.1 to about 50 p.s.i.a. to volatilize the unreacted reactant.

6. The process of claim 1 wherein the alcohol is selected from the class consisting of methyl alcohol, ethyl alcohol, n-propyl alcohol, and isopropyl alcohol.

7. The process of claim 1 wherein the copolymer is reacted with the reactant under alkaline conditions.

8. The process of claim 1 wherein a reinforcing agent is present in the hydrolysis reaction zone.

9. The process of claim 8 wherein the reinforcing agent is fiber glass.

10. The process of claim 8 wherein the reinforcing agent is acicular calcium metasilicate.

11. The process of claim 8 wherein the reinforcing agent is fiber glass and calcium metasilicate.

12. The process of claim 8 wherein the reinforcing agent is fiber glass and asbestos.

13. The process of claim 1 wherein a substituted benzotriazole is present in the hydrolysis reaction zone.

* * * * *